United States Patent
Koch

(10) Patent No.: US 7,410,291 B2
(45) Date of Patent: Aug. 12, 2008

(54) TEMPERATURE-MEASURING DEVICE WITH FUNCTION INDICATOR

(75) Inventor: Jochim Koch, Ratzeburg (DE)

(73) Assignee: Dräger Medical AG & Co. KG, Lübeck (DE)

( * ) Notice: Subject to any disclaimer, the term of this patent is extended or adjusted under 35 U.S.C. 154(b) by 126 days.

(21) Appl. No.: 11/426,670

(22) Filed: Jun. 27, 2006

(65) Prior Publication Data

US 2007/0038141 A1    Feb. 15, 2007

(30) Foreign Application Priority Data

Aug. 11, 2005    (DE)    ............... 10 2005 037 921

(51) Int. Cl.
  *G01K 1/20*    (2006.01)
  *G01K 7/17*    (2006.01)
  *A61B 5/01*    (2006.01)

(52) U.S. Cl. .............. 374/163; 374/102; 374/57; 600/549

(58) Field of Classification Search ............ 374/4, 374/43–45, 57, 100–14, 109–112, 163, 170; 600/549, 474; 702/139
See application file for complete search history.

(56) References Cited

U.S. PATENT DOCUMENTS

| 3,933,045 | A |   | 1/1976  | Fox et al. |
| 4,005,605 | A | * | 2/1977  | Michael ...................... 374/129 |
| 4,237,732 | A | * | 12/1980 | Grein et al. ................. 374/183 |
| 4,295,475 | A |   | 10/1981 | Torzala |
| 4,967,382 | A | * | 10/1990 | Hall ............................ 700/278 |
| 5,732,711 | A |   | 3/1998  | Fitzpatrick et al. |
| 6,077,228 | A | * | 6/2000  | Schonberger ............... 600/549 |
| 6,547,745 | B1 |  | 4/2003  | Rubinstein |
| 6,847,913 | B2 | * | 1/2005 | Wigley et al. ............... 702/131 |
| 6,852,085 | B2 | * | 2/2005 | Rubinstein ................. 600/549 |
| 6,929,611 | B2 |  | 8/2005  | Koch |
| 7,329,044 | B2 | * | 2/2008 | Sato et al. ................... 374/121 |
| 2001/0016318 | A1 | * | 8/2001 | Watanabe et al. .............. 435/6 |
| 2003/0032893 | A1 |  | 2/2003 | Koch |
| 2004/0097825 | A1 | * | 5/2004 | Klyukin ..................... 600/549 |
| 2004/0116822 | A1 | * | 6/2004 | Lindsey ..................... 600/549 |
| 2004/0152991 | A1 | * | 8/2004 | Pompei ..................... 600/474 |
| 2005/0043631 | A1 | * | 2/2005 | Fraden ...................... 600/474 |
| 2005/0245839 | A1 | * | 11/2005 | Stivoric et al. ............. 600/549 |
| 2006/0042278 | A1 | * | 3/2006 | Ludwig et al. ................ 62/130 |
| 2007/0295713 | A1 | * | 12/2007 | Carlton-Foss ............... 219/497 |

FOREIGN PATENT DOCUMENTS

| DE | 2121189    |   | 11/1971 |
| DE | 3040204    |   | 5/1981 |
| DE | 10139705   |   | 4/2003 |
| JP | 11123179 A | * | 5/1999 |
| WO | WO 01/01093 |  | 1/2001 |

* cited by examiner

*Primary Examiner*—Gail Verbitsky
(74) *Attorney, Agent, or Firm*—McGlew & Tuttle, P.C.

(57) ABSTRACT

A function indicator for a dual temperature sensor, which indicates the falling off of the sensor from the skin surface (4) of a patient. An evaluating device (2) determines the body temperature from a first measured temperature value ($T_A$) and determines the contact of the dual temperature sensor (1) with the skin surface (4) by comparison of the measured temperature values $T_A$ and $T_B$.

20 Claims, 3 Drawing Sheets

TEMPERATURE-MEASURING DEVICE WITH FUNCTION INDICATOR

CROSS REFERENCE TO RELATED APPLICATIONS

This application claims the benefit of priority under 35 U.S.C. § 119 of German Patent Application DE 10 2005 037 921.4 filed Aug. 11, 2005, the entire contents of which are incorporated herein by reference.

FIELD OF THE INVENTION

The present invention pertains to a temperature-measuring device with a first temperature sensor and with a second temperature sensor, which are arranged in the form of a dual temperature sensor opposite each other, wherein either the first temperature sensor or the second temperature sensor is in contact with the skin surface of a patient for detecting a first measured temperature value, while the temperature sensor arranged opposite with the second measured temperature value is thermally coupled with the temperature in the environment of the measuring point.

BACKGROUND OF THE INVENTION

A temperature-measuring device with a dual temperature sensor is known from DE 101 39 705 A1. In the prior-art dual temperature sensor, two temperature sensors are arranged on opposite sides of a sensor housing, thermally insulated from one another. One of the temperature sensors is directly in contact with the surface of the patient's skin, while the other temperature sensor measures the temperature in the environment. The dual temperature sensor can be attached to the skin in different ways. In case of temperature measurements on the head, a head band made of an elastic material, which can be adapted to the shape of the head especially well, is suitable. The dual temperature sensor is frequently attached with adhesive strips in case of temperature measurements in the abdominal region. The manner of attaching also depends on the patient's physical activity.

If the dual temperature sensor is not arranged properly or if there is increased physical activity, it may happen that the dual temperature sensor separates from the skin surface and the temperature measurement is interrupted. The falling off of the dual temperature sensor from the skin surface must be indicated in a short time in case of medical applications in order for the interruption of the measured data acquisition to be limited to the absolute minimum. This is especially important when the temperature is used as a parameter for a temperature or heating output regulation.

Various function indicators are known for indicating the contact of a sensor with the skin surface. Thus, an additional optical sensor, which detects the change in the position of the dual temperature sensor in relation to the skin surface, can be used.

In a device known from U.S. Pat. No. 5,732,711, the skin temperature is measured with two temperature sensors arranged adjacent to one another. The processed measured temperature signals are compared with one another by forming the difference, and the exceeding of a predetermined limit value of the temperature difference is used as an indicator for a temperature sensor that is no longer in contact with the skin surface. The prior-art monitoring device is suitable for certain sensor designs only, and an additional temperature sensor is needed for the monitoring only.

SUMMARY OF THE INVENTION

The basic object of the present invention is to provide a temperature-measuring means with a function indicator for a dual temperature sensor.

According to the invention, a temperature-measuring device is provided with a first temperature sensor and with a second temperature sensor, which are arranged in the form of a dual temperature sensor with the first temperature sensor opposite the second temperature sensor. Either the first temperature sensor or the second temperature sensor is in contact with the skin surface of a patient for detecting a first measured temperature value $T_A$ at a measuring point, while the temperature sensor arranged opposite detects a second measured temperature value $T_B$ that is thermally coupled with the temperature in the environment of the measuring point. An evaluating means is provided which determines the body temperature from the first measured temperature value $T_A$ and determines the contact of the dual temperature sensor with the skin surface by comparison of the measured temperature values $T_A$, $T_B$.

The evaluating means may advantageously be designed to calculate the body core temperature from the measured temperature values $T_A$, $T_B$ The evaluating means may advantageously be designed to form a sum and a difference from the measured temperature values $T_A$, $T_B$ and to compare the changes over time in the sum and the difference with respect to the similarity of the signals as an indicator of the contact of the dual temperature sensor with the skin surface.

The evaluating means may advantageously determine the similarity of the signals from Pearson's correlation coefficient.

The function indicator proposed according to the present invention requires no additional sensor for monitoring the contact of a dual temperature sensor with the skin surface, but the design of the dual temperature sensor and a special evaluation of the measured temperature values are used as the indicator. Due to the heat conduction within the dual temperature sensor between the temperature sensors, a change in temperature at the sensor directed toward the environment also causes a change in temperature on the skin side of the dual temperature sensor. Due to the different thermal conductivities of the dual temperature sensor and the patient's body, changes in temperature have different effects on the two temperature sensors, which appears, for example, from the evaluation of the temperature sums from the two measured temperature values. Contrary to this, a change in temperature acts on the two sensors in the same manner, i.e., with a similar rate of change, in case of a dual temperature sensor having fallen off from the skin surface, so that only the absolute value of the temperature sum changes. The slopes of the two individual temperatures would be equal (or similar), and the absolute temperatures also become like each other. The temperature difference between the two sensors tends toward zero in this case.

Corresponding to DE 101 39 705 A1 (and U.S. Pat. No. 6,929,611 which is incorporated by reference), the body core temperature can advantageously also be determined with the dual temperature sensor. The temperature sensor measuring the skin temperature is positioned now such that it is in contact, via a vertical axis of the center between the eyes, with the forehead and the lateral blood vessels of the temple and somewhat below the hairline with the head. As an alternative, the dual temperature sensor may also be attached to the temple, preferably in the area where the fontanelle is located in infants. The abdomen is also a measuring point known for years in premature babies and newborn infants.

A temperature sum and a temperature difference are advantageously formed from the measured temperature values of the sensors. The measured temperature values of the sensors are determined for this purpose approximately once per second, and the duration of a time interval being considered for the formation of the temperature sum and the temperature difference is about 60 seconds. The temperature sum and the temperature difference are then correlated with one another by determining the so-called Pearson's correlation coefficient. The correlation coefficient can be between +1 and −1 and is an indication of the similarity of the signals. In case of a value of +1, there is an ideal similarity between the temperature sum and the temperature difference. The value −1 represents an ideal similarity with a phase shift of 180°. A value of 0 means that there is no similarity.

Which of the temperature sensors is in contact with the skin surface can be determined from the sign of the correlation coefficient. Depending on the attachment of the dual temperature sensor to the skin surface, the correlation coefficient is either +1 or −1. A correlation coefficient on the order of magnitude of 0 indicates that the dual temperature sensor has fallen off.

An exemplary embodiment of the present invention is shown in the figure and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
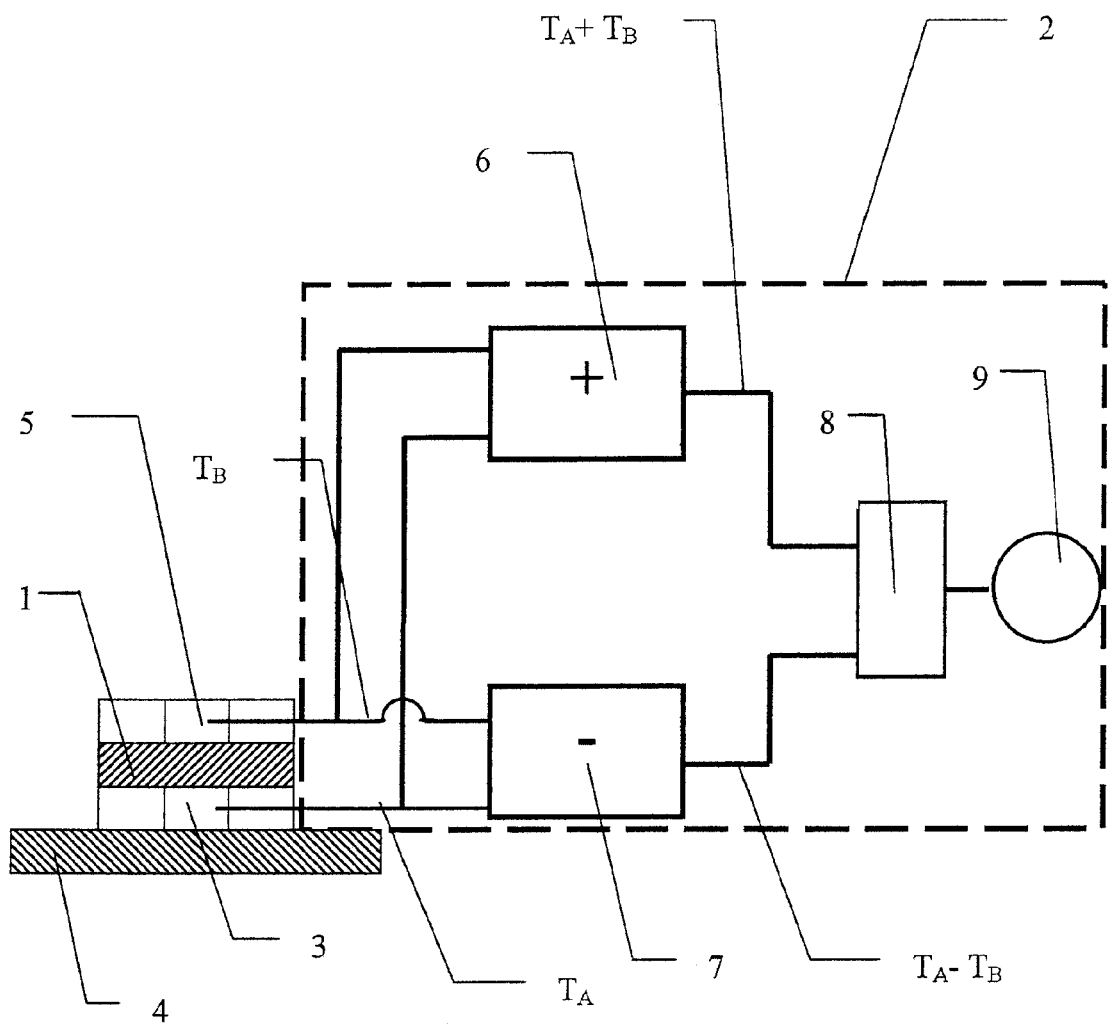
FIG. 1 is a schematic view showing a dual temperature sensor with a first evaluating circuit for forming a temperature sum and a temperature difference in accordance with the invention.

Referring to the drawings in particular, FIG. 1 schematically illustrates the design of a dual temperature sensor 1 and of an evaluating circuit 2, which is connected to the dual temperature sensor 1. The dual temperature sensor 1 contains a first temperature sensor 3, which is in contact with the skin surface 4 of a patient, not shown in greater detail, and a second temperature sensor 5, which is arranged in such a way that it is thermally insulated against the first temperature sensor 3. The first temperature sensor 3 detects the temperature of the skin surface 4 in channel A as a first measured temperature value $T_A$, while the second temperature sensor 5 in channel B with the second measured temperature value $T_B$ is thermally coupled with the temperature in the environment of the measuring point. The evaluating circuit 2 contains a summation element 6 for forming a sum, $T_A$ plus $T_B$, from the measured temperature values $T_A$ and $T_B$, and a subtraction element 7 for determining a difference $T_A$ minus $T_B$. A calculating unit 8 forms a Pearson's correlation coefficient from the sum $T_A$ plus $T_B$ and the difference $T_A$ minus $T_B$.

If the first temperature sensor 3 has contact with the skin surface 4, the correlation coefficient is +1. If the dual temperature sensor 1 is rotated by 180°, so that the second temperature sensor 5 is in contact with the skin surface and the first temperature sensor 3 measures the temperature of the environment, the correlation coefficient is −1. A correlation coefficient of 0 indicates that there is no correlation and the dual temperature sensor 1 has fallen off from the skin surface 4. An acoustic and optical signal is sent via a warning unit 9 when the dual temperature sensor 1 has become detached from the skin surface 4.

Figure 2:
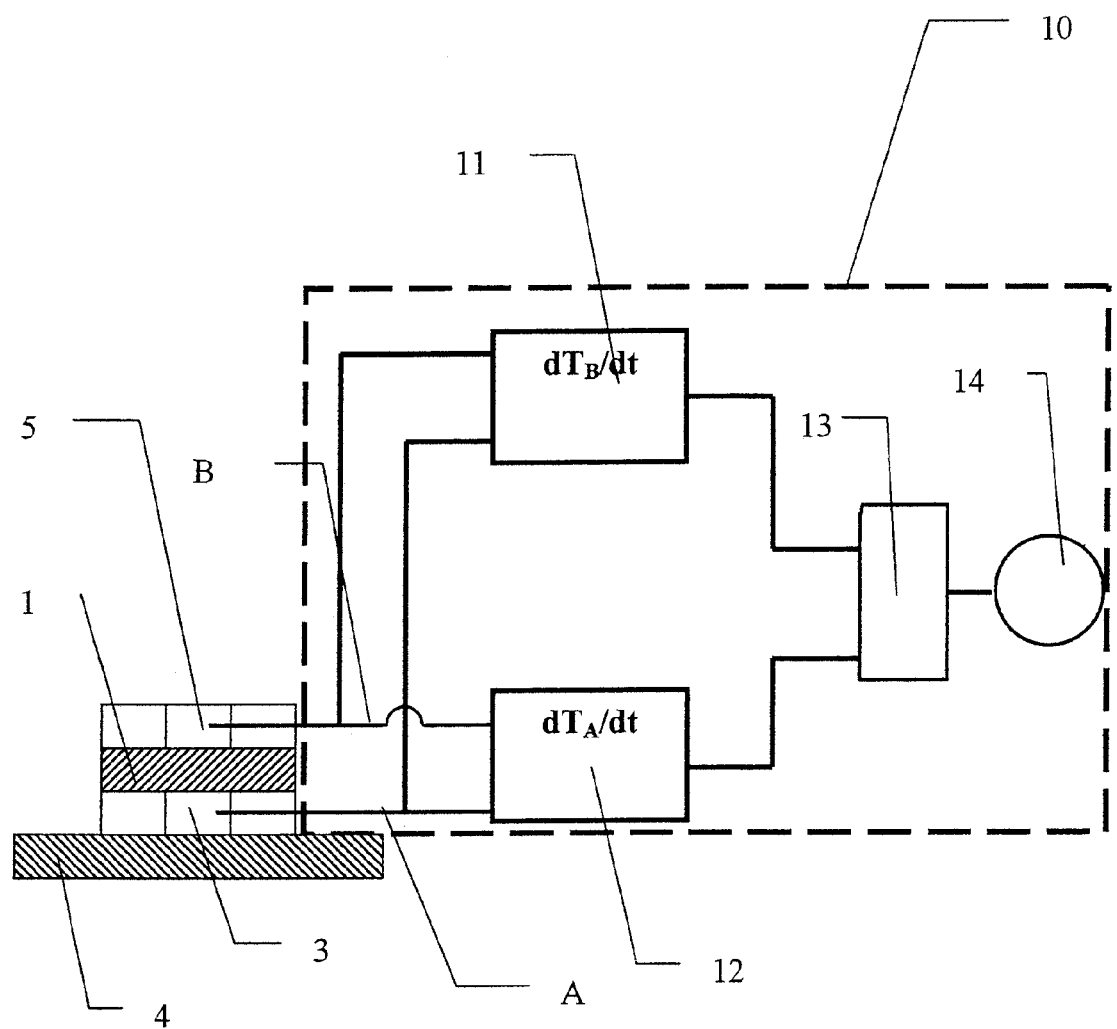
FIG. 2 is a schematic view of a dual temperature sensor according to FIG. 1 with an alternative evaluating circuit, which determines the slopes of the measured temperature values.

FIG. 2 schematically illustrates the design of an alternative evaluating circuit 10 for the dual temperature sensor 1, in which the slopes of the measured temperature values $T_A$ and $T_B$ are formed by means of differentiating circuits 11, 12. The product of the slopes is formed in a downstream calculating unit 13 and it is evaluated whether the product assumes a negative value over a predetermined time interval. The exceeding of the time criterion is considered to be the falling off of the dual temperature sensor 1 from the skin surface 4, and a warning unit 14 acoustically and optically indicates the falling off of the sensor.

The checking of the falling off of the sensor is based on the fact that the two measuring channels A and B of the dual temperature sensor 1 are coupled with one another and behave in the same direction. The slopes of the measured temperature values $T_A$ and $T_B$ are measured approximately once per second and multiplied by one another.

Figure 3:
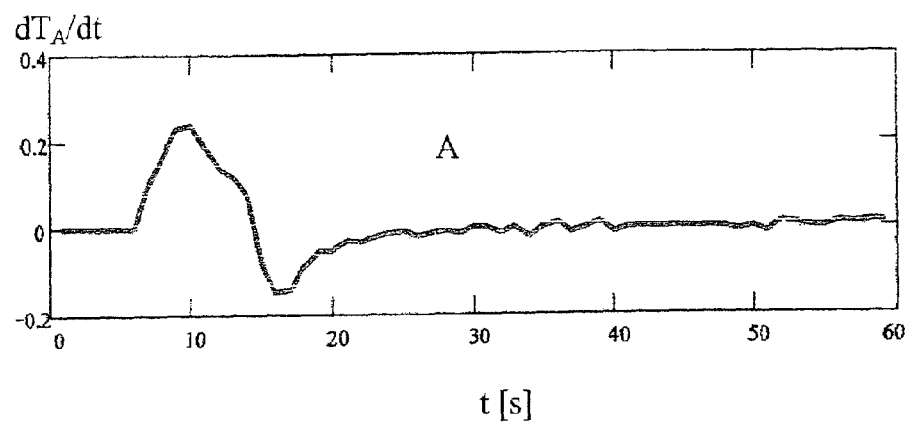
FIG. 3 is a diagram showing the changes over time in the slope of the first measured temperature value $T_A$ from the first temperature sensor.

FIG. 3 illustrates the course of the slope $d\,T_A/dt$ of the first measured temperature value $T_A$ as a function of the time t for a dual temperature sensor 1, which is in contact with the skin surface 4.

Figure 4:
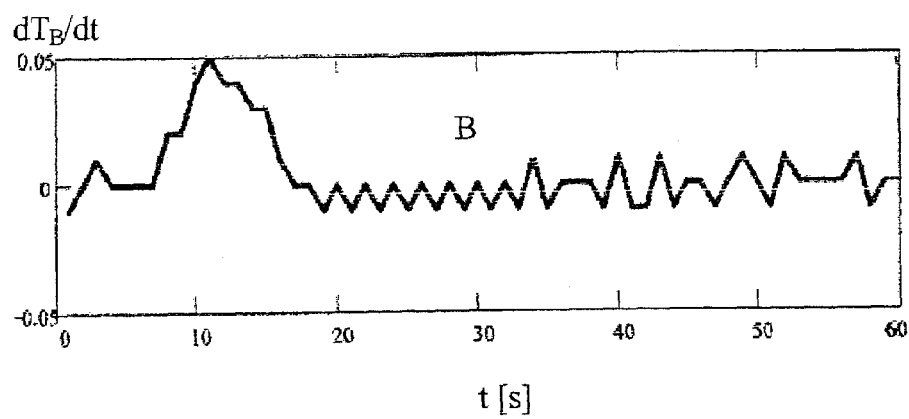
FIG. 4 is a diagram showing the changes over time of the slope of the second measured temperature value $T_B$ from the second temperature sensor.

FIG. 4 shows the course of the slope $d\,T_B/dt$ of the second measured temperature value $T_B$ as a function of the time t.

Figure 5:
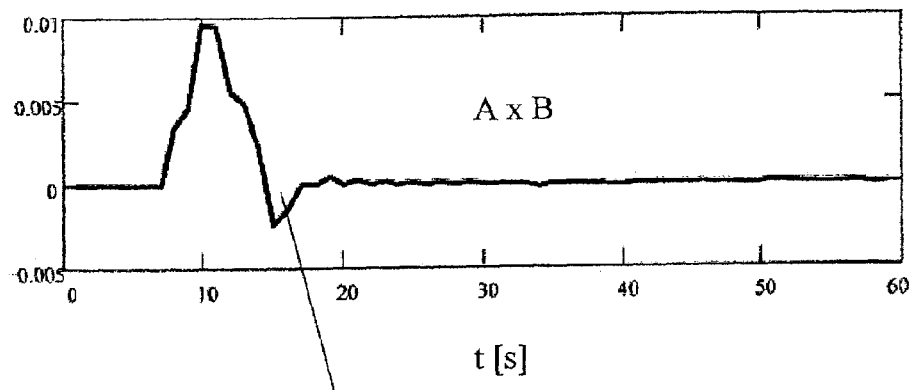
FIG. 5 is a diagram showing the product of the slopes of the measured temperature values according to FIGS. 3 and 4.

FIG. 5 shows the product of the slopes $d\,T_A/dt \times d\,T_B/dt$ from the channels A and B.

The product assumes a negative value for a short time interval 15. A time interval for the negative value, which can be significantly assigned to the separation of the temperature sensor from the skin surface 4, is determined by experiments for detecting the falling off of the sensor.

While specific embodiments of the invention have been shown and described in detail to illustrate the application of the principles of the invention, it will be understood that the invention may be embodied otherwise without departing from such principles.

What is claimed is:

1. A temperature-measuring device comprising:
   a first temperature sensor;
   a second temperature sensor, said first temperature sensor and said second temperature sensor being arranged opposite each other to form a dual temperature sensor, wherein one of said first temperature sensor or said second temperature sensor is in contact with a skin surface of a patient for detecting a first measured temperature value $T_A$ and the other of said first temperature sensor and said second temperature sensor is arranged opposite and detects a second measured temperature value $T_b$ thermally coupled with the temperature in the environment of the skin surface;

an evaluating means for determining the body temperature of the patient from said first measured temperature value $T_A$ and determining whether said dual temperature sensor is in contact with said skin surface by comparing said measured temperature value $T_A$ with said measured temperature value $T_B$ and using a rate of change of said measured temperature value $T_A$ and a rate of change of said measured temperature value $T_B$ to indicate whether said dual temperature sensor is in contact with said skin surface.

2. A temperature-measuring device in accordance with claim 1, wherein said evaluating means calculates a body core temperature from said measured temperature values $T_A$, $T_B$.

3. A temperature-measuring device in accordance with claim 1, wherein said evaluating means forms a sum and a difference from said measured temperature values $T_A$, $T_B$ compares the changes over time in the sum and the difference with respect to similar rates of change of the signals as an indicator of the contact of said dual temperature sensor with said skin surface.

4. A temperature-measuring device in accordance with claim 3, wherein said evaluating means determines the the rates change of said signals from Pearson's correlation coefficient.

5. A temperature-measuring device in accordance with claim 1, wherein said dual temperature sensor is not in contact with said skin surface when said rate of change of said first measured temperature value $T_A$ is similar to said rate of change of said second measured temperature value $T_B$.

6. A temperature-measuring device in accordance with claim 1, wherein said first temperature sensor has a first thermal conductivity and said second temperature sensor has a second thermal conductivity, said second thermal conductivity being different from said first thermal conductivity.

7. A temperature-measuring device in accordance with claim 1, further comprising an alarm means for indicating when said dual temperature sensor is not in contact with said skin surface.

8. A temperature-measuring device comprising:
a patient skin temperature sensor having a first thermal conductivity;
an environment temperature sensor having a second thermal conductivity, said first thermal conductivity being different from said second thermal conductivity, said patient skin temperature sensor and said environment temperature sensor being arranged opposite each other, wherein said patient skin temperature sensor is in contact with the skin surface of a patient during use for detecting a patient skin measured temperature value over time and said environment temperature sensor is arranged opposite thereto and detects an environment measured temperature value over time;
an evaluating device for determining the body temperature of the patient from the patient skin measured temperature value and for determining the status of the contact of the patient skin temperature sensor with the skin surface of the patient by comparing a time rate of change of the patient skin measured temperature value with a time rate of change of the environment measured temperature value, said evaluating device providing as output an alarm signal when said time rate of change of the patient skin measured temperature value is substantially equal to said time rate of change of the environment measured temperature value.

9. A temperature-measuring device in accordance with claim 8, wherein said patient skin temperature sensor is not in contact with said skin surface when said rate of change of said patient skin temperature sensor is substantially similar to said rate of change of said environment temperature sensor.

10. A temperature-measuring device in accordance with claim 8, further comprising an alarm means for receiving said alarm signal and providing as output an alert.

11. A temperature-measuring device in accordance with claim 8, wherein said evaluating device calculates a body core temperature from said patient skin measured temperature value and said environment measured temperature value.

12. A temperature-measuring device in accordance with claim 8, wherein said evaluating device forms a sum and a difference from said patient skin measured temperature value and said environment measured temperature value and compares the changes over time in the sum and the difference with respect to the similar rates of change of the signals as an indicator of the contact of the patient skin temperature sensor with said skin surface.

13. A temperature-measuring device in accordance with claim 12, wherein said evaluating device determines the rates of change of the signals of said patient skin temperature sensor and environment temperature sensor by forming a Pearson's correlation coefficient from the sum and the difference.

14. A temperature-measuring method comprising the steps of:
providing a patient skin temperature sensor with an environment temperature sensor at an opposite side;
placing the patient skin temperature sensor in contact with the skin surface of a patient so the opposite side is positioned thermally coupled with the temperature in the environment of the skin surface;
detecting a patient skin measured temperature value using said patient skin temperature sensor;
detecting an environment measured temperature value using said environment temperature sensor;
providing an evaluating device for receiving a patient skin measured temperature value and for receiving an environment measured temperature value;
determining a rate of change of said patient skin measured temperature value over time with said evaluating device;
determining a rate of change of said environment measured temperature value over time with said evaluating device;
comparing said rate of change of said patient skin measured temperature with said environment measured temperature;
determining a status of the contact of said patient skin temperature sensor with the skin surface of the patient based on said comparison of said rate of change of said patient skin measured temperature and said rate of change of said environment measured temperature.

15. A temperature-measuring method in accordance with claim 14, wherein said evaluating device calculates a body core temperature from said patient skin measured temperature value and said environment measured temperature value.

16. A temperature-measuring method in accordance with claim 14, wherein said evaluating device forms a sum and a difference from said patient skin measured temperature value and said environment measured temperature value and compares the changes over time in the sum and the difference with respect to similar rates of change of the signals as an indicator of the contact of the patient skin temperature sensor with said skin surface.

17. A temperature-measuring method in accordance with claim 16, wherein said evaluating device determines the the signals of said patient skin temperature sensor and said environment temperature sensor have similar rates of change by forming a Pearson's correlation coefficient from the sum and the difference. signal when said patient skin temperature sensor is not in contact with said skin surface.

18. A temperature-measuring method in accordance with claim 16, wherein said patient skin temperature sensor is not in contact with said skin surface when said rate of change of said patient skin temperature sensor is similar to said rate of change of said environment temperature sensor.

19. A temperature-measuring method in accordance with claim 16, wherein said patient skin temperature sensor has a first thermal conductivity and said environment temperature sensor has a second thermal conductivity, said second thermal conductivity being different from said first thermal conductivity.

20. A temperature-measuring method in accordance with claim 16, further comprising an alarm means for providing an alarm signal when said patient skin temperature sensor is not in contact with said skin surface.

* * * * *